United States Patent [19]

Ahuja

[11] Patent Number: 4,565,617
[45] Date of Patent: Jan. 21, 1986

[54] PHOTOVOLTAIC ENERGY GAS GENERATING APPARATUS

[76] Inventor: Om Ahuja, 89 Clearmeadow Dr., East Meadow, N.Y. 11554

[21] Appl. No.: 331,971

[22] Filed: Dec. 18, 1981

[51] Int. Cl.[4] .................... C25B 15/08; C25B 9/00; C25B 11/04
[52] U.S. Cl. ................... 204/229; 204/270; 204/278; 204/292; 204/290 R
[58] Field of Search .............. 136/243, 244, 251, 252, 136/259; 204/129, 248, 258, 266, 278, 229, 270, 292

[56] References Cited

U.S. PATENT DOCUMENTS

| | | | |
|---|---|---|---|
| 3,630,879 | 12/1971 | Spacil et al. | 204/248 |
| 4,253,925 | 3/1981 | Mason | 204/129 |
| 4,352,722 | 10/1982 | Ohkawa | 204/129 |

FOREIGN PATENT DOCUMENTS

| | | | |
|---|---|---|---|
| 2810913 | 9/1979 | Fed. Rep. of Germany | 204/129 |
| 16284 | 2/1976 | Japan | 204/129 |
| 116601 | 9/1980 | Japan | 204/129 |

Primary Examiner—Donald R. Valentine

[57] ABSTRACT

The present invention provides an apparatus for converting sea water or fresh water into hydrogen, oxygen and/or chlorine, by electrolysis using photovoltaic cells and solar energy as the energy source. The apparatus is designed to float in sea water or fresh water, with the photovoltaic cells disposed across its top constituting a solar cell panel. Below the solar panel there is provided a collecting chamber with a plurality of nickel-plated hydrogen collecting tubes vertically disposed and connected to the chamber at their upper ends. The tubes are open at their bottom ends, so that water may rise within the tubes. Electrolysis of the water within the vertical tubes, caused by the solar cell panel, in turn causes hydrogen to collect above the water within each tube, and the float to rise in the water as the hydrogen level increases. A solid state float valve operates a signal to indicate that the maximum hydrogen has been collected.

16 Claims, 6 Drawing Figures

→ TO TRANSMITTER EMITTING A CODED SIGNAL CONTINUOUSLY UPON THE MODULE REACHING 2m ht.

ANODE
+ ○ OUTSIDE ELECTRODE
− ○ CATHODE
INSIDE ELECTRODE
($H_2$ COLLECTOR)

PHOTOVOLTAIC ENERGY GAS GENERATING APPARATUS

The present invention provides an apparatus for converting solar energy into stored hydrogen for further use as an energy source. The apparatus is immersed in either sea water or fresh water so that the solar energy reduces the water into its components of hydrogen $H_2$, oxygen $O_2$, or chlorine $Cl_2$. The hydrogen can be collected as an energy source, the chlorine can be separately collected, and the oxygen can either be dissipated or collected if desired.

More particularly the invention provides floats for immersion in sea water or fresh water which essentially have a solar cell panel on its top surface and a plurality of hydrogen collector tubes vertically disposed below such solar cell panel. The sea water or fresh water rises in such tubes which are open at their bottom ends. As the water is converted by the solar cell panel into oxygen and hydrogen, the latter is collected in the tubes above the water level.

BACKGROUND OF THE INVENTION

The present invention relates to a solar energy apparatus which is particularly designed to convert sea water or fresh water by electrolysis and the use of photovoltaic cells into hydrogen, and to collect and store the same for use as an energy source.

Applicant is aware of the fact that there have been numerous proposals for the use of solar energy to generate hydrogen as an energy source. Applicant is unaware, however, of any proposal which remotely resembles his apparatus.

It is also well recognized that it would indeed be useful, as a source of energy, if salt water and fresh water by the use of photovoltaic cells, solar activated, could be converted into hydrogen, with the hydrogen then being compressed and stored, and later used as a fuel or energy source.

SUMMARY OF THE INVENTION

The present invention provides an apparatus for converting sea water or fresh water into hydrogen, oxygen and/or chlorine, by electrolysis using photovoltaic cells and solar energy as the energy source, such apparatus being designed to float in sea water or fresh water, with the photovoltaic cells disposed across its top and constituting a solar cell panel. The apparatus also has disposed below its solar panel a collecting chamber and a plurality of hydrogen collecting tubes, vertically disposed and connected to said chamber at their upper ends, said tubes being open at their bottom ends, so that water may rise within the tubes.

By suitable connections and circuitry, electrolysis of the water within the vertical tubes, caused by the solar cell panel, in turn causes hydrogen to collect within the water within each tube, and the float to rise in the water as the hydrogen level increases. At a predetermined level a solid state float valve operates a signal to indicate that the maximum hydrogen has been collected.

PRIOR ART

According to applicant's best knowledge the following United States patents and one German patent application are the only patents and patent application which remotely pertain to the present invention:

United States

U.S. Pat. No. 3,925,212, Tchernev;
U.S. Pat. No. 4,011,149, Nozik;
U.S. Pat. No. 4,021,323, Kilby et al.;
U.S. Pat. No. 4,090,933, Nozik;
U.S. Pat. No. 4,124,464, Miyatani et al.;
U.S. Pat. No. 4,144,147, Jarrett et al.;
U.S. Pat. No. 4,211,620, Fowler.

Germany

Verwaltungs-GmbH - patent application No. P 28 10 913.9 filed Sept. 27, 1979 for "Plant and Process for Producing Hydrogen"

In applicant's opinion none of the U.S. prior art patents and the one German patent application discloses the invention herein sought to be patented.

DETAILED DESCRIPTION OF THE INVENTION

For a more detailed description of the present invention, reference will now be made to the accompanying drawings, wherein.

Figure 1:
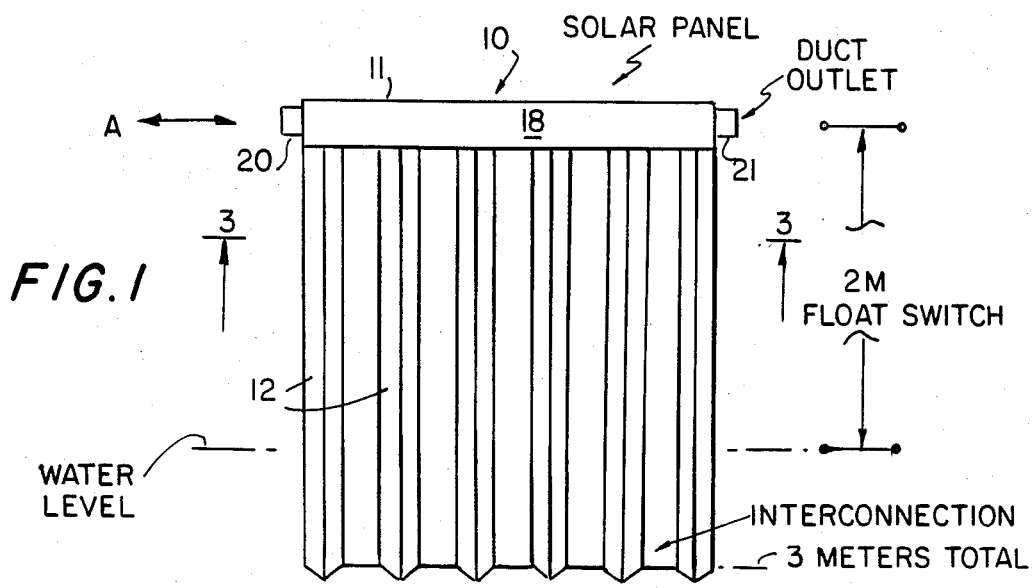
FIG. 1 is a front elevational view of one of the floats provided by the present invention.

It will be noted that FIG. 1 shows a front elevational view of a typical float 10 provided by the present invention. Such float consists essentially of the top or horizontal solar panel 11 and open-ended vertical tubes 12, the open ends of such tubes being shown at 13 and being provided with suitable bracing 14 to maintain them in assembled and spaced relationship.

Figure 2:
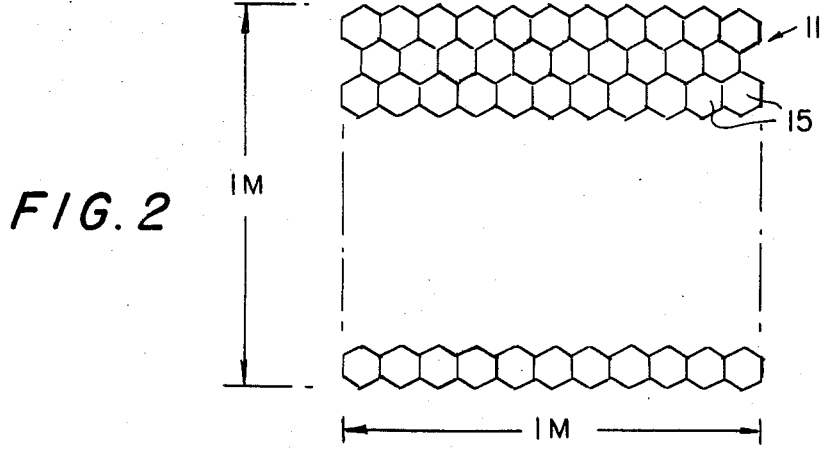
FIG. 2 is a partial top plan view of the float of FIG. 1 showing in particular the solar cell panel.
Figure 3:
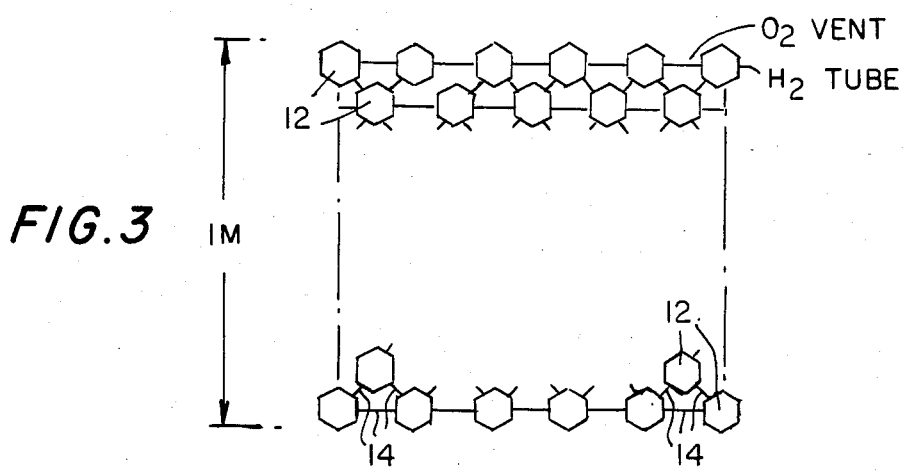
FIG. 3 is a sectional view taken along the line 3—3 of FIG. 1 showing the spaced hydrogen collector tubes.

The solar panel 11, as shown in plan view in FIG. 2, consists of a plurality of silicon solar activated, photovoltaic cells 15 of hexagonal shape which, as shown in FIG. 2, are arranged in closely nested engagement so as to provide the maximum solar surface on the panel 11 and to leave practically no dead spots. The cells may, of course, be of rectangular or any other suitable geometric shape. In the preferred form of the invention the solar cell panel of each float would approximate in dimension 1 meter by 1 meter, as indicated in FIGS. 2 and 3. A Fresnel lens may be spaced over and above the surface of the solar cell panel and made an integral part of such panel. This will increase the efficiency of the solar apparatus.

The vertical tubes 12 are preferably of hexagonal shape and extruded from a lightweight synthetic material such as styrofoam and fiberglass in combination, which impart to them both strength and a specific gravity of less than 1, so that they are buoyant in both sea and fresh water. The inner and outer walls of the tubes 12 are plated with nickel, preferably by chemical reduction.

The solar panel has on its surface solar silicon photovoltaic cells 15 which are approximately 0.2 centimeters in depth. Below such solar cells is provided a common chamber 18 for collecting hydrogen produced within the tubes 12. The common chamber 18 preferably has a height of about 10 centimeters. Such common chamber 18 has at opposite ends duct outlets 20, 21 which can be suitably plugged or, in turn, connected to similar outlets on identical floats arranged in modular fashion as shown in plan in FIG. 4 (for clarity the solar cells are not shown), so as to provide a common outlet for pickup of the hydrogen by a barge or other vessel equipped with a compressor for compressing and storing the hydrogen accumulated in the modular floats. It will be noted from FIG. 5 that the solar cell panel 11 has an anode connection to the outside of the nickel-plated collector tubes 12 and has a cathode connection to the inside of the collector tubes 12, so that during electrolysis the hydrogen is collected inside the tubes 12 and oxygen is separated outside the tubes 12.

Figure 6:
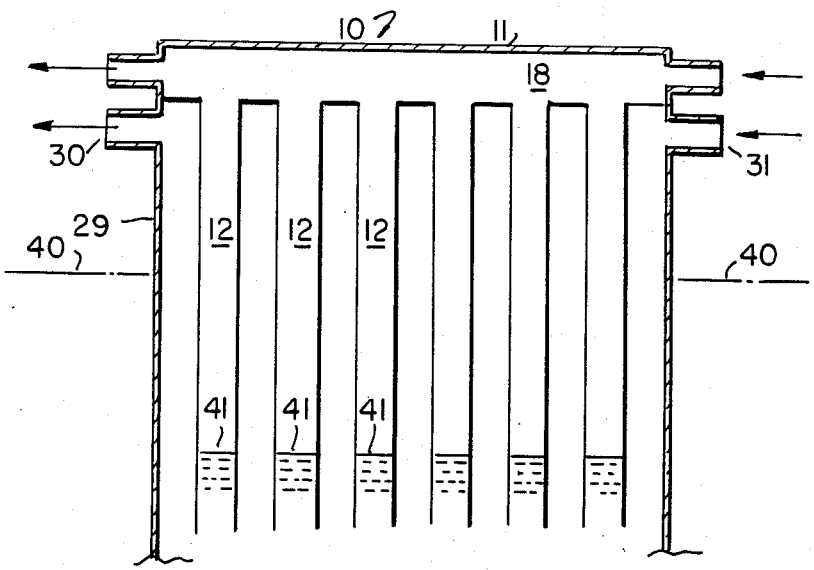
FIG. 6 shows in vertical cross section an alternative construction of the float of FIGS. 1, 2 and 3 wherein a skirt is provided around the entire float, which enables collection of the anode gases, such as oxygen or chlorine.

In FIG. 6, the float 10 is shown as having a skirt 29 which depends from the upper collector 18. Thus, it will be noted that the hydrogen collecting tubes 12 which communicate directly with the collecting chamber 18 are separated from the oxygen or other anode gases, so that the latter which are confined between the extension of hydrogen collecting tubes 12 and the skirt 29 may be collected by separate outlets 30 and 31. In FIG. 6 the exterior water level is shown at 40, 40 and the water level within tubes 12, 12 is shown at 41, 41.

Figure 4:
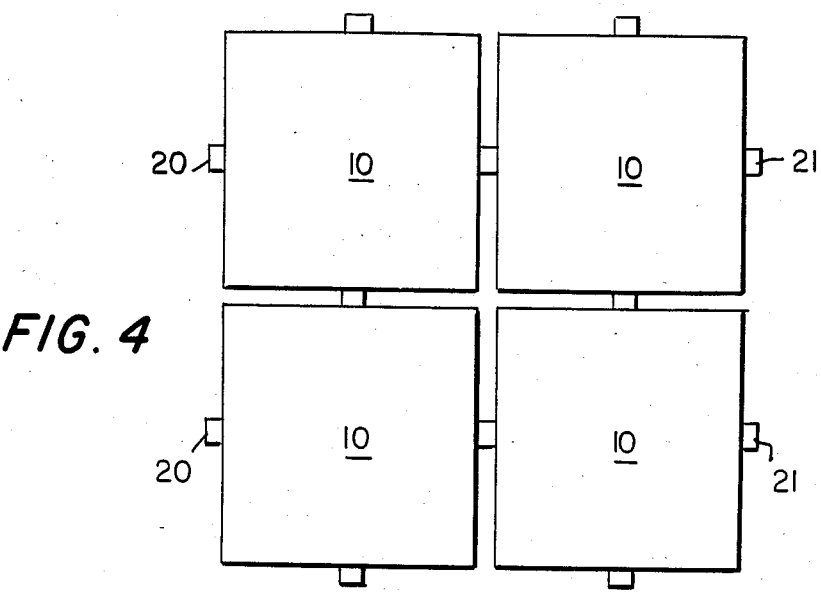
FIG. 4 is a plan view showing four floats of the type shown in FIGS. 1, 2 and 3 modularly arranged and interconnected.
Figure 5:
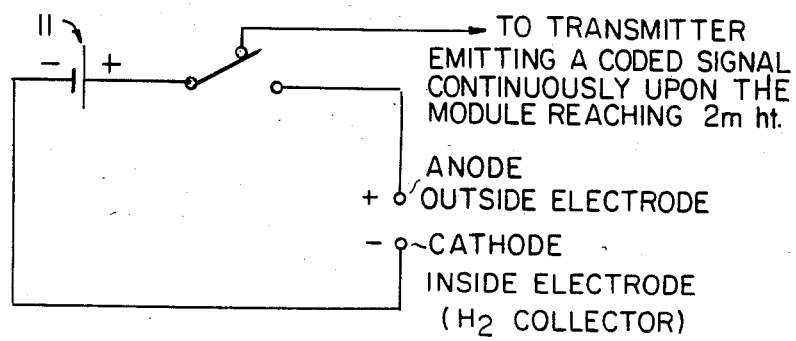
FIG. 5 is a schematic circuit diagram showing a float switch which is actuated when the float reaches a predetermined height in the water environment.

The float switch shown in FIG. 5 is so designed that when the floats 10 having approximately 3 meters in height, rise out of the water for about 2 meters, the float switch will close and emit continuous coded signals to alert the barge operator that it is time to remove the collected hydrogen. Only one transmitter is required for a system consisting of a plurality of floats connected in modular fashion as shown in FIG. 4.

It also should be noted that the entire system floating near shore may be connected via one pipe and emptied continuously as the need for hydrogen (energy) arises. Conversely it may also be used as a push-pull system where the hydrogen generated by day is used to generate electricity for peak hours and then by night the system used as an electrolysis plant using off-peak electrical energy from on shore.

What I claim is:

1. An apparatus for the recovery and storage of hydrogen, cathode gas, from water, said apparatus comprising:
   (a) an aquatic float, said float defining:
      (i) a cathode gas collection chamber,
      (ii) at least one outlet to said collection chamber for withdrawing the collected gas,
      (iii) a plurality of elongate tubes extending downwardly from said collection chamber and in open communication therewith,
      (iv) the displacement of the float creating a column of water within each said elongate tube,
   (b) at least one cathode within each elongate tube, said cathodes extending downwardly from the upper ends of said elongate tubes to a predetermined level,
   (c) at least one anode outside said elongate tubes extending downwardly from said float into said water,
   (d) a photovoltaic panel mounted on said collection chamber and in electrical communication with said cathodes and anodes to electrolyze said water and collect the electrolyzed cathode gas about said cathode within said elongate tubes, whereby the electrolyzed cathode gas rises within said elongate tubes to collect within said collection chamber until the float rises above said predetermined level, whereupon the electrolysis is automatically terminated as said cathodes and, or anodes rise above said water.

2. An apparatus according to claim 1, wherein said elongate tubes are nickel-plated and laterally spaced apart, whereby the anode gases, produced by electrolysis may be dissipated to the atmosphere.

3. An apparatus according to claim 1, wherein said elongate tubes are composed of lightweight composite material, such as styrofoam and fiberglass in combination, are nickel-plated on their inner and outer surfaces, and have a specific gravity of less than one.

4. An apparatus according to claim 1, comprising a plurality of floats connected together in modular fashion, whereby the collected hydrogen may be removed by a common vent.

5. An apparatus according to claim 1, which, when immersed in sea water, has collector means for the anode gases produced by electrolysis, in addition to the hydrogen collector means.

6. An apparatus for the recovery and storage of hydrogen, cathode gas, and oxygen, anode gas, from water, said apparatus comprising:
   (a) an aquatic float defining:
      (i) first and second collection chambers,
      (ii) at least one outlet to each collection chamber for withdrawing the collected gases,
      (iii) a plurality of elongate tubes extending downwardly from said first collection chamber through said second collection chamber, said tubes being in open communication with said first collection chamber,
      (iv) at least one second collection chamber surrounding said elongate tubes and extending downwardly into said water,
      (v) the displacement of the float creating a column of water within each said elongate tube,
   (b) at least one first electrode within each elongate tube, said first electrode extending downwardly from the upper ends of said elongate tubes to a predetermined level,
   (c) at least one second electrode extending downwardly into the water outside said elongate tubes within said second collection chamber,
   (d) a photovoltaic panel mounted on said collection chambers and in electrical communication with said first and second electrodes whereby cathode gas is electrolyzed about the first electrodes connected as cathodes, and anode gas is electrolyzed about the second electrodes connected as anodes, whereby the electrolyzed gases rise within said elongate tubes to collect within said collection chambers until the float rises above said predetermined level, whereupon the electrolysis is automatically terminated as said cathodes and, or anodes rise above said water.

7. An apparatus according to claim 6, wherein said elongate tubes are nickel-plated and laterally spaced apart, whereby the anode gases, produced by electrolysis, may be dissipated to the atmosphere.

8. An apparatus according to claim 6, wherein said elongate tubes are composed of a lightweight composite material, such as styrofoam and fiberglass in combination, are nickel-plated on their inner and outer surfaces, and have a specific gravity of less than one.

9. An apparatus according to claim 6, comprising of a plurality of floats connected together in modular fashion, whereby the collected hydrogen, cathode gas, and oxygen, anode gas, may be removed by a common vent for each gas.

10. An apparatus according to claim 6, which when immersed in sea water, has collector means for the anode gases produced by electrolysis, in addition to hydrogen, cathode gas, collector means.

11. A modular apparatus for the recovery and storage of at least hydrogen, cathode gas, from water, said apparatus comprising:
 (a) a plurality of modular aquatic floats adapted for fluid communication between adjacent modules,
 (b) each module having:
  (i) at least one collection chamber for collecting said cathode gas,
  (ii) at least one outlet for withdrawing said collected cathode gas, and interconnecting said collection chamber to adjacent modules,
  (iii) a plurality of elongate tubes extending downwardly from said collection chamber and in open communication therewith,
  (iv) the displacement of each module creating a column of water within each said elongate tube,
  (v) at least one first electrode within each said elongate tube, said first electrodes extending downwardly from the upper ends of said elongate tubes to a predetermined level,
  (vi) at least one second electrode outside said elongate tubes extending downwardly from said module into said water,
  (vii) a photovoltaic panel mounted on said collection chamber and in electrical communication with said first and second electrodes to define the first electrodes as cathodes within said elongate tubes for the collection of said cathode gas, and the second electrodes as anodes,
 (c) means for interconnecting the outlets of the adjacent modules to equalize the collected cathode gas and permit the withdrawal of the collected cathode gas therefrom,
whereby said gas will rise within the elongate tubes to the collection chamber to progressively raise the level of the interconnected modules to said predetermined level, whereupon electrolysis is automatically terminated as said cathodes and, or anodes rise above said water.

12. An apparatus according to claim 11, wherein said elongate tubes are nickel-plated and laterally spaced apart, whereby the anode gases, produced by electrolysis, may be dissipated to the atmosphere.

13. An apparatus according to claim 11, wherein said elongate tubes are composed of a lightweight composite material, such as styrofoam and fiberglass in combination, are nickel-plated on their inner and outer surfaces, and have a specific gravity of less than one.

14. A modular apparatus for the recovery and storage of hydrogen, cathode gas, and oxygen, anode gas, from water, said apparatus comprising:
 (a) a plurality of modular aquatic floats adopted for fluid communication between adjacent modules,
 (b) each module having:
  (i) a first and a second collection chamber for collecting said cathode and anode gases,
  (ii) at least one outlet to each collection chamber for withdrawing said collected gases, and interconnecting said collection chambers to the respective collection chambers of said adjacent modules,
  (iii) a plurality of elongate tubes extending downwardly from said collection chambers and in open communication therewith,
  (iv) the displacement of each module creating a column of water within each said elongate tube,
  (v) at least one first electrode within each elongate tube, said first electrode extending downwardly from the upper ends of said elongate tubes to a predetermined level,
  (vi) at least one second electrode outside said elongate tubes within said second chamber extending downwardly from said module into said water,
  (vii) a photovoltaic panel mounted on said collection chambers and in electrical communication with said first and second electrodes to define the first electrodes as cathodes within said elongate tubes for the collection of cathode gas, and the second electrodes as anodes within said second collection chamber for collection of anode gas,
 (c) means for interconnecting the outlets of the adajacent modules to equalize the collected cathode gas, and anode gas respectively, and permit the withdrawal of the collected gases therefrom,
whereby said gases will rise within the elongate tubes to the collection chambers respectively, to progressively raise the level of the interconnected modules to said predetermined level, whereupon electrolysis is automatically terminated as said cathodes and, or anodes rise above said water.

15. An apparatus according to claim 14, wherein said elongate tubes are nickel-plated and laterally spaced apart, whereby the anode gases, produced by electrolysis, may be dissipated to the atmosphere.

16. An apparatus according to claim 14, wherein said elongate tubes are composed of a lightweight composite material, such as styrofoam and fiberglass in combination, are nickel-plated on their inner and outer surfaces, and have a specific gravity of less than one.

* * * * *